United States Patent
O'Brien et al.

(10) Patent No.: US 10,051,841 B2
(45) Date of Patent: Aug. 21, 2018

(54) RETRACTABLE PET LEASH ASSEMBLY

(71) Applicant: Doskocil Manufacturing Company, Inc., Arlington, TX (US)

(72) Inventors: Carolyn O'Brien, Roswell, GA (US); John C. Evans, Sandy Springs, GA (US)

(73) Assignee: DOSKOCIL MANUFACTURING COMPANY, INC., Arlington, TX (US)

(*) Notice: Subject to any disclaimer, the term of this patent is extended or adjusted under 35 U.S.C. 154(b) by 264 days.

(21) Appl. No.: 15/172,314

(22) Filed: Jun. 3, 2016

(65) Prior Publication Data
US 2017/0347630 A1 Dec. 7, 2017

(51) Int. Cl.
*A01K 27/00* (2006.01)
*B65H 75/44* (2006.01)

(52) U.S. Cl.
CPC ....... *A01K 27/004* (2013.01); *B65H 75/4431* (2013.01); *B65H 75/4444* (2013.01)

(58) Field of Classification Search
CPC ..... A01K 27/00; A01K 27/003; A01K 27/004
See application file for complete search history.

(56) References Cited

U.S. PATENT DOCUMENTS

| 3,693,596 | A | * | 9/1972 | Croce | A01K 27/004 119/796 |
| 3,853,283 | A | * | 12/1974 | Croce | A01K 27/004 119/796 |
| 5,377,626 | A | * | 1/1995 | Kilsby | A01K 27/004 119/796 |
| 9,339,014 | B1 | * | 5/2016 | Wettermann | A01K 27/004 |
| 2006/0266300 | A1 | * | 11/2006 | Perkitny | A01K 27/004 119/713 |
| 2007/0131177 | A1 | * | 6/2007 | Perkitny | A01K 27/004 119/796 |
| 2013/0008392 | A1 | * | 1/2013 | Holmstrom | A01K 27/004 119/796 |
| 2014/0033992 | A1 | | 2/2014 | Reed | |

FOREIGN PATENT DOCUMENTS

| EP | 3284339 A1 | 2/2018 |
| WO | 2015008222 A2 | 1/2015 |

OTHER PUBLICATIONS

Extended European Search Report dated Jan. 22, 2018 in corresponding European Patent Application No. 17174243, filed Jun. 2, 2017.

* cited by examiner

*Primary Examiner* — Monica L Williams
(74) *Attorney, Agent, or Firm* — Global IP Counselors, LLP

(57) ABSTRACT

A retractable pet leash assembly includes a housing, a spool, a leash and a braking assembly. The spool is disposed inside the housing and biased by a spring and includes braking notches. The leash is wound about the spool. The braking assembly includes a pawl, a pawl spring and an operating member. The pawl selectively engages the braking notches, the pawl spring biases the pawl towards engagement with the spool. The operating member moves the pawl between first and second positions to move the pawl into and out of the path of the braking notches. The operating member has a pawl non-engaged position in which the pawl is in the first position, a first pawl engaged position in which the pawl is in the second position, and a second pawl engaged position in which the operating member is retained while the pawl is in the second position.

20 Claims, 9 Drawing Sheets

RETRACTABLE PET LEASH ASSEMBLY

RELATED INVENTION

This invention is related to U.S. Application Publication Number 2014/0238314 A1 (application Ser. No. 14/268,403) filed on May 2, 2014.

BACKGROUND

Field of the Invention

This invention generally relates to a retractable pet leash assembly. More specifically, the present invention relates to a retractable pet leash assembly having a plurality of operating conditions.

Background Information

Generally, a retractable pet leash assembly is configured to automatically retract so that the leash is always taut. This configuration helps to prevent a pet from tripping over the leash as the pet walks faster or slower, and may aid in the control of the pet. Typically, a retractable leash includes a handle and a user operating member disposed adjacent the handle for convenience. Some retractable pet leashes have a button or a lever to prevent the leash from extending while allowing retraction of the leash only.

SUMMARY

Generally, the present disclosure is directed to various features of a retractable pet leash assembly having a plurality of operating conditions.

In view of the state of the known technology and in accordance with a first aspect of the present disclosure, a retractable pet leash assembly is basically provided having a housing, a spool, a leash and a braking assembly. The spool is rotatably disposed inside the housing. The spool is biased to rotate in a first rotational direction by a retraction spring. The spool has a plurality of braking notches. The leash is wound about the spool and extendable from the housing. The braking assembly includes a pawl, a pawl spring and an operating member. The pawl is configured to selectively engage the braking notches of the spool. The pawl spring biases the pawl towards engagement with the spool. The operating member is movably arranged with respect to the housing to selectively move the pawl between a first position and a second position. The pawl is disposed out of a rotational path of the braking notches in the first position. The pawl is disposed in the rotational path of the braking notches in the second position. The operating member has a pawl non-engaged position, a first pawl engaged position and a second pawl engaged position. The pawl is held in the first position by the operating member when the operating member is in the pawl non-engaged position. The pawl is in the second position when the operating member is operated with respect to the housing and the operating member is in the first pawl engaged position. The pawl is retained in the second position when operating member is retained with respect to the housing in the second pawl engaged position.

In accordance with a second aspect of the present invention, a retractable pet leash assembly is basically provided having a housing, a spool, a leash and a braking assembly. The spool is rotatably disposed inside the housing and is biased to rotate in a first rotational direction by a retraction spring. The spool has a plurality of braking notches. The leash is wound about the spool and extendable from the housing. The braking assembly includes a pawl and an operating member. The pawl is configured to selectively engage the braking notches of the spool. The operating member is movable along a first operating path to move the pawl between a first position and a second position. The pawl is disposed out of a rotational path of the braking notches in the first position. The pawl is disposed in the rotational path of the braking notches in the second position. The operating member is movable along a second operating path to retain the operating member relative to the housing while the pawl is maintained in the second position. The second operating direction is not parallel with the first operating direction.

Other objects, features, aspects and advantages of the disclosed retractable pet leash assembly will become apparent to those skilled in the pet product field from the following detailed description, which, taken in conjunction with the annexed drawings, discloses two embodiments of the retractable pet leash assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the pet products field from this disclosure that the following descriptions of the embodiments are provided for illustration only and not for the purpose of limiting the invention as defined by the appended claims and their equivalents.

Figure 1:
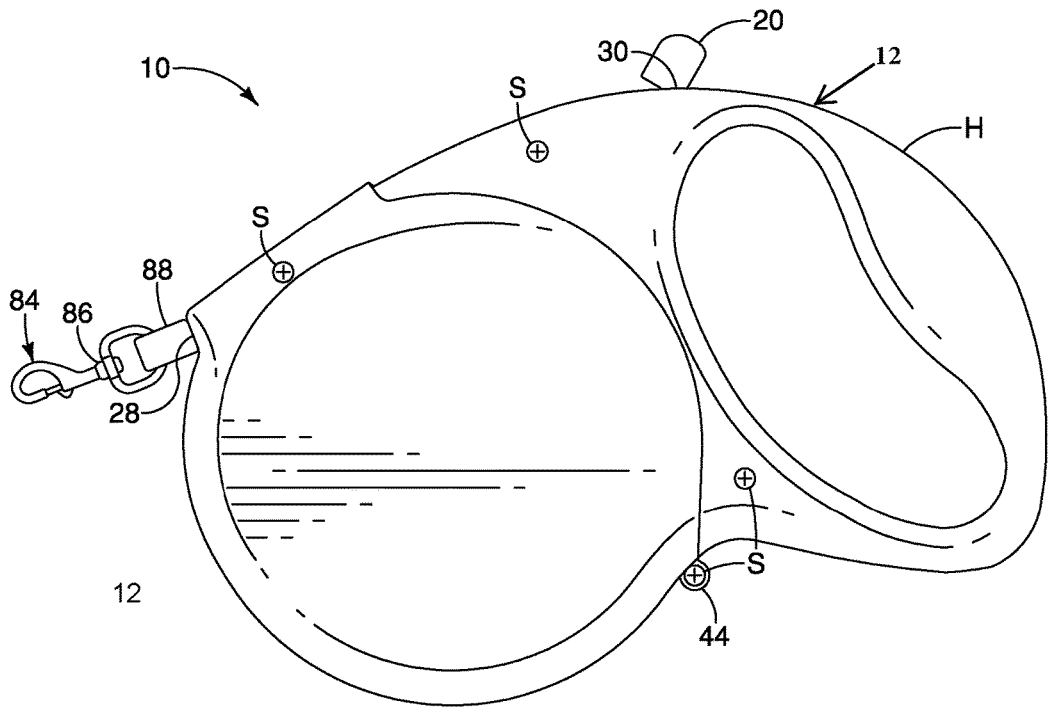
FIG. 1 is a side elevational view of a retractable pet leash assembly in accordance with one illustrated embodiment.
Figure 2:
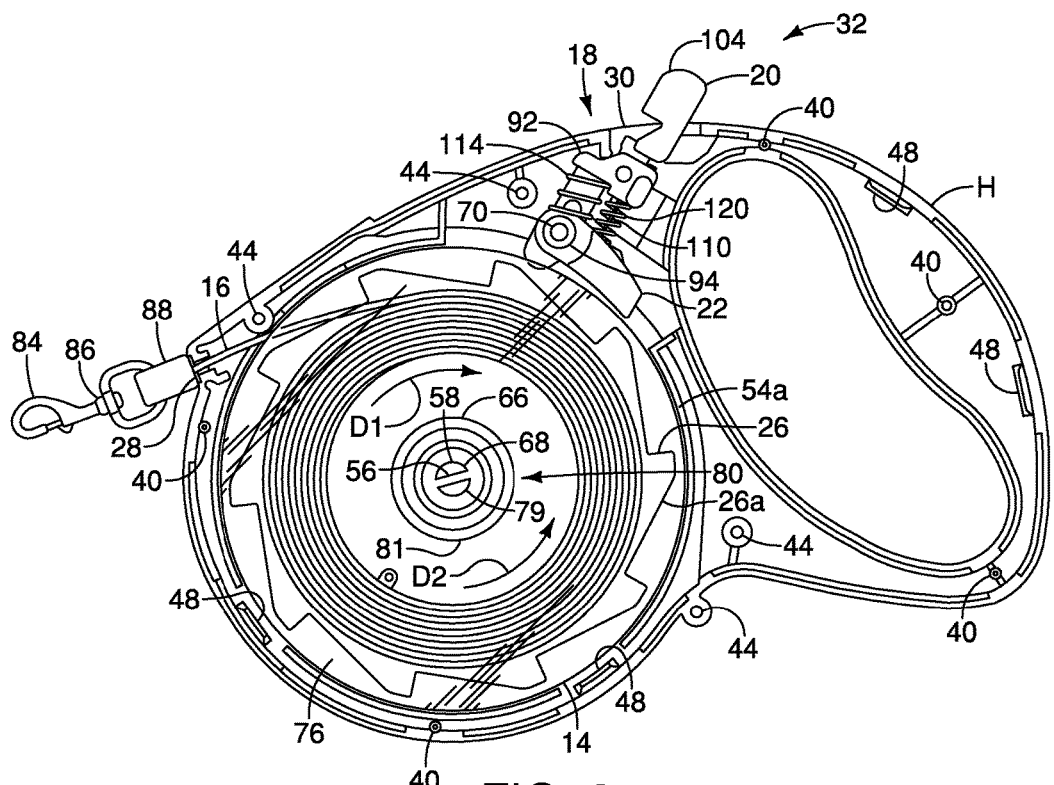
FIG. 2 is a side elevational view of the retractable pet leash assembly illustrated in FIG. 1 with a part of the housing removed to reveal a spool and a braking assembly disposed in the housing.
Figure 9:
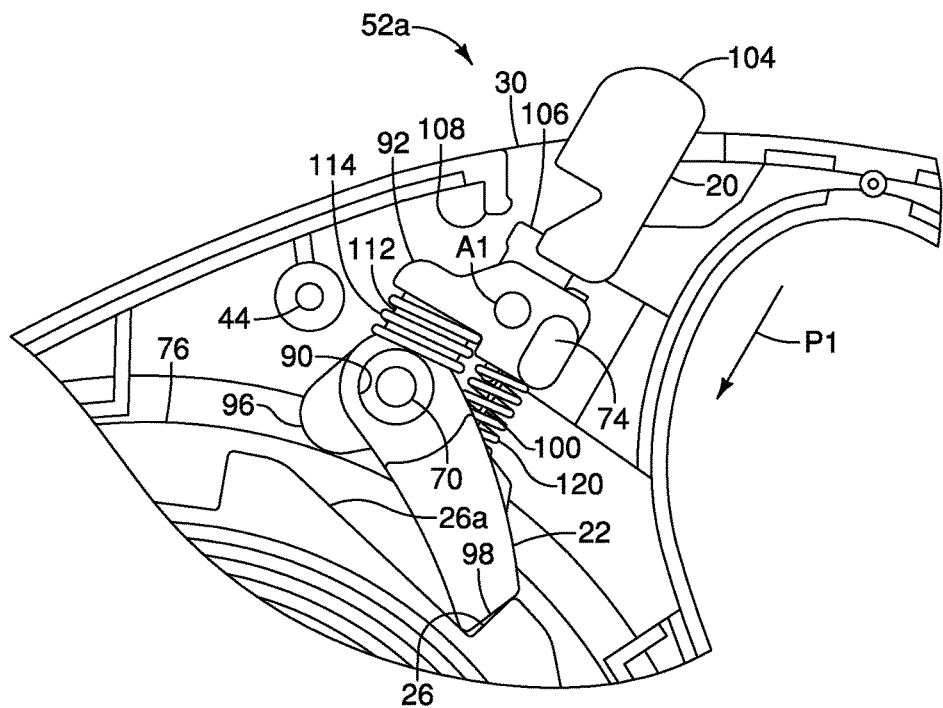
FIG. 9 is a partial elevational view of the retractable pet leash assembly illustrated in FIGS. 1 to 4 with the operating member in a first pawl engaged position and the pawl in a second position.
Figure 10:
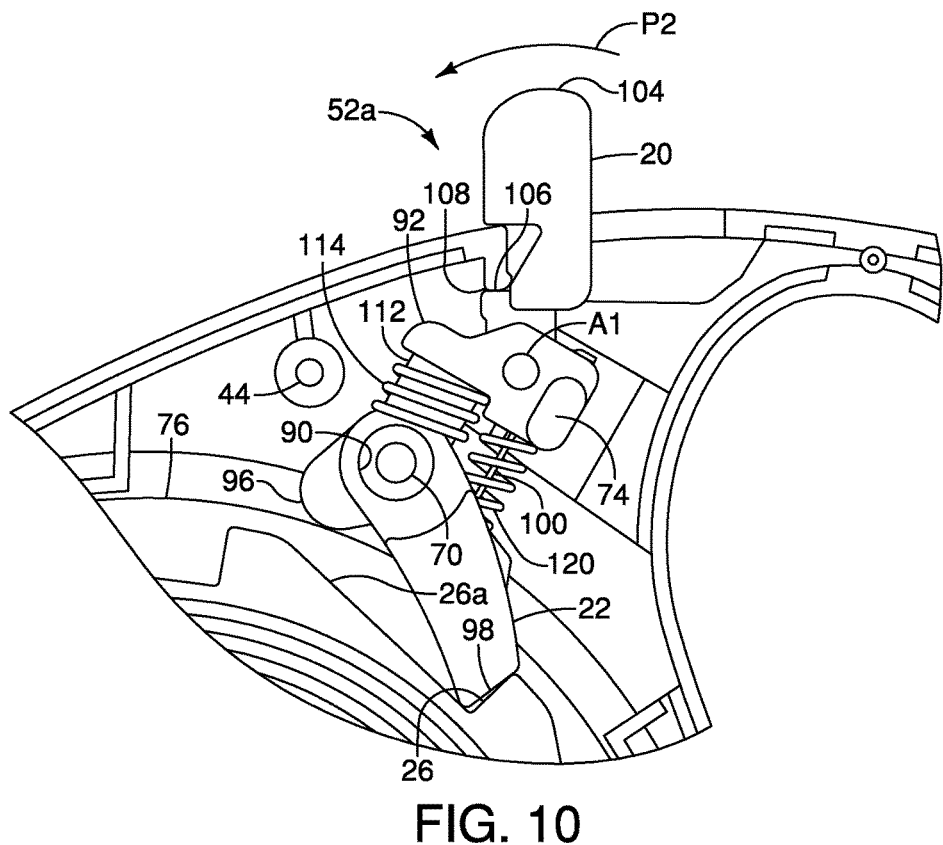
FIG. 10 is a partial view of the retractable pet leash assembly illustrated in FIGS. 1 to 4 with the operating member in a second pawl engaged position and the pawl in the second position.

Referring initially to FIGS. 1 and 2, a retractable pet leash assembly 10 (hereinafter "the leash assembly 10") is provided in accordance with a first illustrated embodiment. The leash assembly 10 comprises a housing 12, a spool 14, a leash 16 and a braking assembly 18. The leash assembly 10 is configured to be secured to a pet collar or harness (not shown) to retain a pet. The leash assembly 10 is designed such that the leash 16 automatically retracts into the housing 12 after the leash 16 is extended from the housing 12. In particular, the spool 14 of the leash assembly 10 is biased to rotate in a direction to retract the leash 16 into the housing 12. The braking assembly 18 includes an operating member 20 that is movable to operate the leash assembly 10 between three operating conditions. In particular, the leash assembly 10 includes a first operating condition (FIGS. 2, 7 and 8), a second operating condition (FIG. 9) and a third operating condition (FIG. 10). In the first operating condition, the operating member 20 is at a rest position (i.e., not being operated upon), and the leash 16 is biased to retract but can be extended from the housing 12. In the second operating condition, the leash 16 is retractable only. The second operating condition is established by the user pushing the operating member 20 into the housing 12 and holding the operating member 20 in a depressed state. In the third operating condition, the leash 16 is also retractable only. The third operating condition is established by the user first pushing the operating member 20 into the housing 12 to attain the second operating condition, and then pivoting the operating member 20 forward into engagement with the housing 12. In this way, the user operating member 20 is retained with respect to the housing 12 so that the leash assembly 10 can be maintained in the third operating condition without need for continual user operation of the operating member 20.

Figure 5:
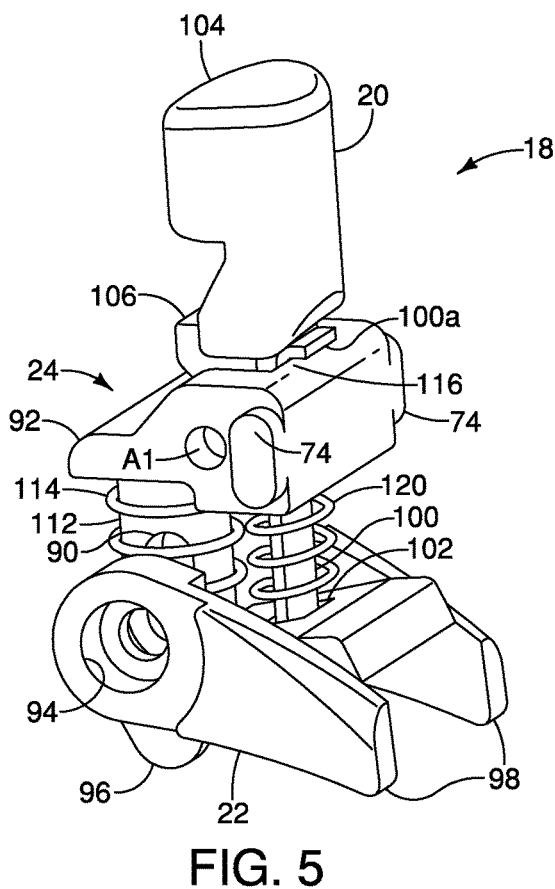
FIG. 5 is a top perspective view of the braking assembly illustrated in FIG. 2 removed from the housing.
Figure 6:
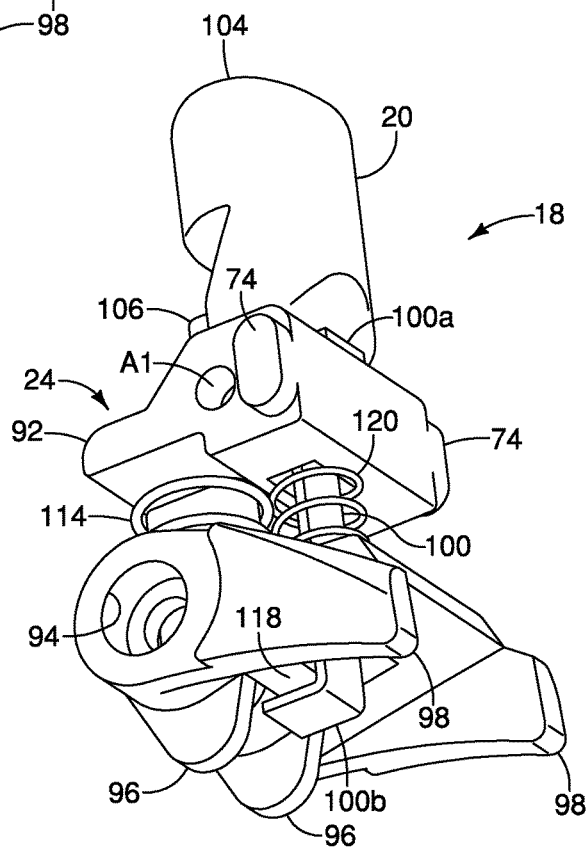
FIG. 6 is a bottom perspective view of the braking assembly illustrated in FIGS. 2 and 5 removed from the housing.

As best seen in FIG. 2, the spool 14, the leash 16 and the braking assembly 18 are disposed in the housing 12. The spool 14 is configured to rotate within the housing 12 in a first rotational direction D1 to retract the leash 16 and a second rotational direction D2 to pay out the leash 16. The first rotational direction D1 is a retraction direction and the second rotational direction D2 is an extension direction. The leash 16 is wound about the spool 14 when the leash 16 is retracted into the housing 12. The braking assembly 18 further includes a pawl 22 and a linkage 24, as also shown in FIGS. 5 and 6. The operating member 20 is interconnected to the pawl 22 by the linkage 24. The operating member 20 is pushed by the user to move the pawl 22 between a first position and a second position. In other words, with the pawl 22 in the first position, the spool 14 can freely rotate in both the first and second rotational directions D1 and D2. The pawl 22 is disposed out of the rotational path of the braking notches 26 in the first position and is in the rotational path of the braking notches 26 in the second position. On the other hand, with the pawl 22 is in the second position, the spool 14 cannot rotate in the second rotational direction D2, but can rotate in the first rotational direction D1. When the pawl 22 engages the braking notches 26, the spool 14 can rotate in the first rotational direction D1 but is prevented from rotating in the second rotational direction D2. The other components and operation of the braking assembly 18 are further discussed below.

Figure 3:
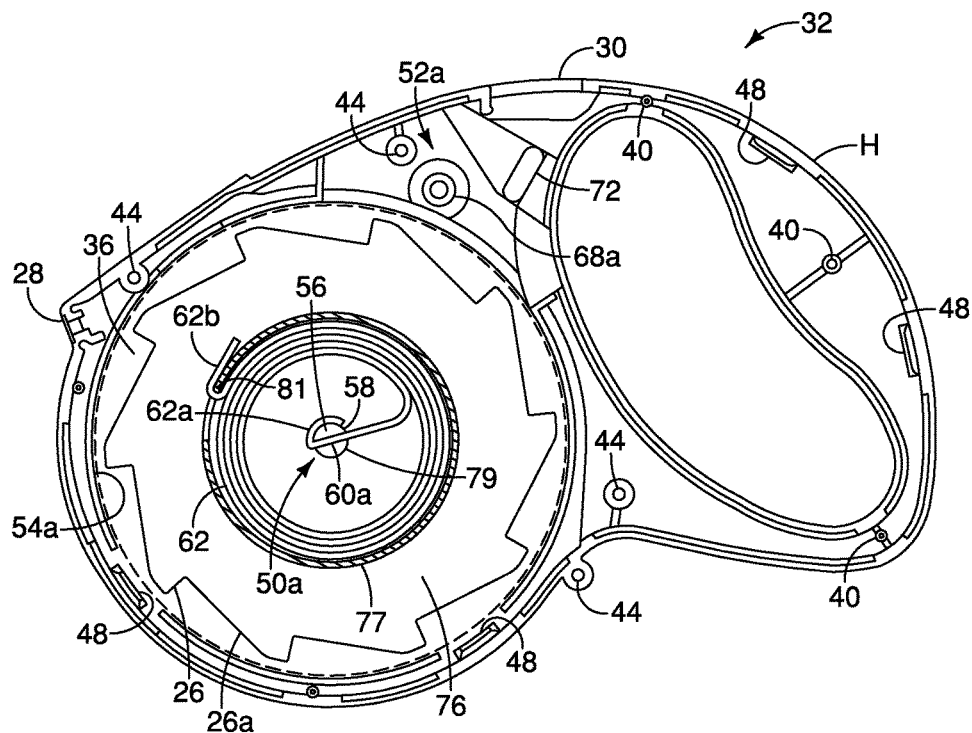
FIG. 3 is a side elevational view of the retractable pet leash assembly illustrated in FIGS. 1 and 2 but with the spool shown in cross section to show a retraction spring of the spool.
Figure 4:
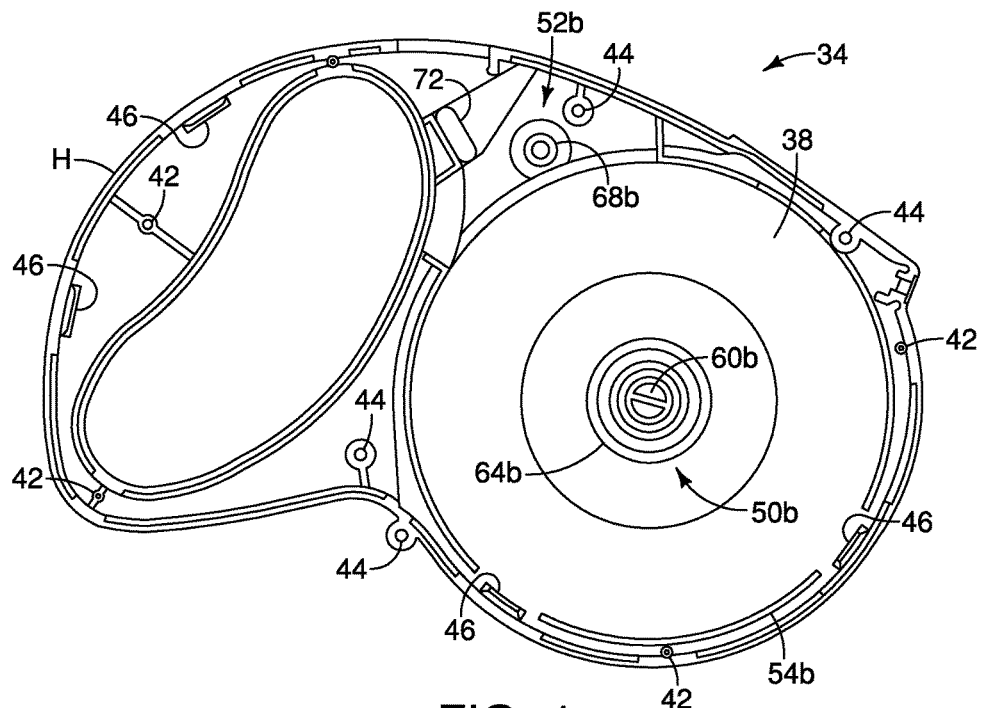
FIG. 4 is an inside elevational view of a second housing part of the retractable pet leash assembly illustrated in FIGS. 1 to 3.

Referring now to FIGS. 2 to 4, the housing 12 of the leash assembly 10 will now be discussed. The housing 12 of the illustrated embodiment as shown is constructed of injection molded plastic. The housing 12 includes a leash opening 28 through which the leash 16 extends. The housing 12 also includes an operating member opening 30 through which the operating member 20 extends. Preferably, the housing 12 is molded to include a handle H that is configured to be gripped by the user. As shown, the handle H is disposed adjacent the operating member 20 for convenient user access. In the illustrated embodiment disclosed, the housing 12 includes a first housing part 32 (FIGS. 2 and 3) and a second housing part 34 (FIG. 4). The first and second housing parts 32 and 34 are each integrally molded as a one-piece member. The first and second housing parts 32 and 34 have corresponding shapes, and are fixedly secured together. As shown, the first and second housing parts 32 and 34 include a first recess 36 and a second recess 38, respectively. The spool 14 and the braking assembly 18 are configured to be disposed within the first and second recesses 36 and 38.

The first and second housing parts 32 and 34 are secured together in a suitable manner such as using an adhesive and/or one or more fasteners. For example, the first housing part 32 includes a plurality of alignment protrusions 40 each configured to be received by one of a plurality of alignment bores 42 of the second housing part 34. It will be apparent to one skilled in the pet product field from this disclosure that the plurality of alignment protrusions 40 and alignment bores 42 can be disposed at various locations on the first and second housing parts 32 and 34 in a variety of configurations, as needed and/or desired. The first and second housing parts 32 and 34 further include a plurality of receiving holes 44 (see FIG. 2), each configured to receive a screw S (see FIG. 1) or other type of fastening member therethrough to securely fix the first and second housing parts 32 and 34 together. In the illustrated embodiment as shown, the first and second housing parts 32 and 34 further include a plurality of engagement flanges 46 that engage a plurality of engagement ledges 48 to secure the first and second housing parts 32 and 34 together via a snap-fit. As seen in FIG. 4, the first housing part 32 includes the engagement ledges 48 and the second housing part 34 includes the engagement flanges 46. However, it will be apparent to one skilled in the pet products field from this disclosure that the engagement flanges 46 and engagement ledges 48 can be can be disposed on the first and second housing parts 32 and 34 in a variety of configurations as needed and/or desired.

Referring now to FIGS. 2 to 4, the first and second recesses 36 and 38 of the first and second housing parts 32 and 34 will now be discussed in greater detail. The first recess 36 includes a spool attachment area 50a and a braking assembly support area 52a. Similar to the first recess 36, the second recess 38 of the second housing part 34 includes a spool attachment area 50*b* and a braking assembly support area 52*b*. The spool 14 is rotatably supported in the spool attachment areas 50*a* and 50*b*, while the braking assembly 18 is movably supported in the braking assembly support areas 52*a* and 52*b*. The spool attachment area 50*a* includes a spool axle 56. The spool axle 56 extends through an axle receiving hole 58 of the spool 14 when the spool 14 is assembled in the first recess 36. In the illustrated embodiment, the spool axle 56 is integrally molded with the first housing part 32 as a one-piece member. It will be apparent to those skilled in the pet product field from this disclosure that the spool axle 56 can be a separate piece fixedly attached to the first housing part 32.

As best seen in FIG. 3, the spool axle 56 includes a slit 60*a*, while as seen in FIG. 4, the spool attachment area 50*b* includes an axle protrusion 60*b* that supports the free end of the spool axle 56 on the second housing part 34. A retraction spring 62 (e.g., a biasing element) of the spool 14 is attached to the spool axle 56 to bias the spool 14 in the first rotational direction D1 with respect to the housing 12. In particular, one end of the retraction spring 62*a* is disposed in the slit 60*a* to fix the retraction spring 62 to the housing 12. The spool attachment area 50*a* can further include a plurality of annular grooves (not shown) arranged concentrically around the spool axle 56 for engaging corresponding grooves 66 of the spool 14 and for receiving a lubricant to enable smooth rotational movement of the spool 14 during use. Similarly, the spool attachment area 50*b* has a plurality of annular grooves 64*b*, as shown in FIG. 4, which are identical to the annular grooves of the spool attachment area 50*a* of the first housing part 32. These annular grooves 64*b* are configured to engage corresponding grooves 81 of the spool 14, and preferably, receives lubricant to enable smooth rotational movement of the spool 14 during use.

As stated previously, the first recess 36 also includes the braking assembly support area 52*a*, while the second recess 38 also includes the braking assembly support area 52*b* for supporting the braking assembly 18. In particular, the first and second recesses 36 and 38 of the housing 12 includes a first axle recess 68*a* and a second axle recess 68*b*, respectively, that supports a linkage axle 70 of the braking assembly 18. More specifically, the first axle recess 68*a* receives a first end of the linkage axle 70, while the second axle recess 68*b* receives a second end of the linkage axle 70. The pawl 22 of the braking assembly 18 is pivotally arranged on the linkage axle 70, while the linkage 24 of the braking assembly 18 is slidably arranged on the linkage axle 70. Thus, the linkage axle 70 of the braking assembly 18 is supported by the housing 12. It will be apparent to those skilled in the pet product field from this disclosure that the linkage axle 70 can also be integrally formed with one of the first and second housing parts 32 and 34 as a one-piece member. However, by making the linkage axle 70 as a separate member from the first and second housing parts 32 and 34, the linkage axle 70 can be made of a different material than the first and second housing parts 32 and 34. For example, as in the illustrated embodiment, the linkage axle 70 can be made of a hard and rigid metallic material, while the first and second housing parts 32 and 34 can be made of a lightweight plastic material.

As best seen in FIG. 3, the braking assembly support area 52*a* of the first housing part 32 further includes at least one first guiding surface 72 that is an oblong shaped recess in the illustrated embodiment. Preferably, as seen in FIG. 4, the braking assembly support area 52*b* of the second housing part 34 includes an identical second guiding surface 72. The first and second guiding surfaces 72 are each configured to engage a protrusion 74 of the linkage 24, also shown in FIGS. 5 and 6. Thus, the housing 12 includes at least one guiding surface 72 that is configured to engage the protrusion 74 of the linkage 24 during operation of the operating member 20. The first and second guiding surfaces 72 are structured to be alignment members to prevent the linkage 24 from pivoting about the linkage axle 70 during operation of the operating member 20. In this manner, the linkage 24 moves along a linear operating path during operation of the operating member 20 in which the pawl 22 moves into and out of engagement with the braking notches 26. The longitudinal ends of the first and second guiding surfaces 72 also determine a linear stroke length of the operating member 20 as it moves the pawl 22 into and out of engagement with the braking notches 26. In particular, the protrusion 74 is biased to contact an upper end of the first and second guiding surfaces 72 in the rest position of the linkage 24 to prevent linear movement of the linkage 24 during non-operation of the operating member 20.

The spool 14 will now be discussed with reference to FIGS. 2 and 3. The spool 14 is rotatably disposed inside the housing 12. As stated above, the spool 14 is configured to rotate about the spool axle 56 of the housing 12 to retract the leash 16 into the housing 12 or to enable extension of the leash 16 out of the housing 12. In the illustrated embodiment as shown, the spool 14 is preferably constructed of a rigid, lightweight material such as plastic. Preferably, the spool 14 is made of injection molded plastic. The spool 14 has a pair of end plates 76 (only one shown in FIG. 2, and the other one shown in FIG. 3) connected by a leash support portion 77.

As mentioned above, the end plates 76 of the spool 14 include the braking notches 26 that are designed to engage the pawl 22 of the braking assembly 18. In the illustrated embodiment as shown, the braking notches 26 are disposed on the side surfaces of both of the end plates 76 of the spool 14. It will be apparent to one skilled in the pet product field from this disclosure that the braking notches 26 can be disposed on just one of the end plates 76 if needed and/or desired. Each of the braking notches 26 is separated by a slanted surface 26*a*. The slanted surfaces 26*a* are downwardly inclined toward a downstream rotational direction from the pawl 22. When the pawl 22 is disposed in the rotational path of the braking notches 26 and the spool 14 is rotating in the first rotational direction D1, the pawl 22 ratchets along the slanted surfaces 26*a* to allow leash retraction. When the pawl 22 is in the rotational path of the braking notches 26, the spool 14 is prevented from rotating in the second extension direction D2 because the pawl 22 engages the braking notches 26 (FIGS. 9 and 10).

Referring back to FIGS. 2 and 3, each of the end plates 76 of the spool 14 includes a housing attachment part 80 (only one shown). The housing attachment parts 80 of the spool 14 include the spool axle receiving hole 79 and the grooves 81 concentrically arranged about the spool axle receiving hole 79. The housing attachment parts 80 of the spool 14 are configured to engage the spool attachment areas 50*a* and 50*b* of the first and second housing parts 32 and 34. Preferably, the housing attachment parts 80 of the spool 14 are also lubricated to enable smooth rotational movement of the spool 14 during use.

As best seen in FIG. 3 and as mentioned above, the spool 14 has the retraction spring 62 wound inside the leash support portion 77 of the spool 14. As previously stated, the leash assembly 10 is designed to automatically retract the leash 16. In particular, the spool 14 is biased to rotate in the first rotational (retraction) direction D1 by the retraction spring 62. In the illustrated embodiment, the retraction spring 62 is a torsion spring constructed of a thin elongated metal sheet. As seen in FIG. 3, a first end 62a of the retraction spring 62 is inserted into the slit 60a of the spool axle 56 to secure the retraction spring 62 to the housing 12. The retraction spring 62 is coiled about the spool axle 56 inside of the leash support portion 77 of the spool 14 and a second end 62b of the retraction spring 62 is secured to the leash support portion 77 of the spool 14. In this way, the spool 14 is spring loaded to rotate in the first rotational direction D1 to retract the leash 16 into the housing 12.

The leash 16 of the leash assembly 10 will now be discussed. The leash 16 is an elongated member wound about the spool 14 and extendable from the leash opening 28 of the housing 12. In particular, the leash is wound about the leash support portion 77 of the spool 14. The leash 16 is a flexible member. Preferably, the leash 16 is made of fabric so that the leash is lightweight and thin.

A first end of the leash 16 is fixed to an axle (not shown) extending between the first and second end plates 76 of the spool 14. A second end of the leash includes a snap hook 84 configured to be fastened to a pet collar or harness. The snap hook 84 includes a swivel 86 to enable rotational movement of the leash 16 when attached to collar or harness. The snap hook 84 is conventional in the pet product field and will not be further discussed herein. In the illustrated embodiment as shown, the leash 16 further includes a stopper 88 disposed adjacent the snap hook 84 that is configured to abut against an outer portion of the housing 12. The stopper 88 is rigid and can be constructed of plastic, rubber or metal.

The braking assembly 18 of the leash assembly 10 will now be discussed with reference to FIGS. 5 to 11. As mentioned above, the basic parts of the braking assembly 18 mainly include the linkage axle 70, the linkage 24, the operating member 20 and the pawl 22. Also mentioned above, the user operates the operating member 20 of the braking assembly 18 to move the leash assembly 10 between the first, second and third operating conditions.

Figure 7:
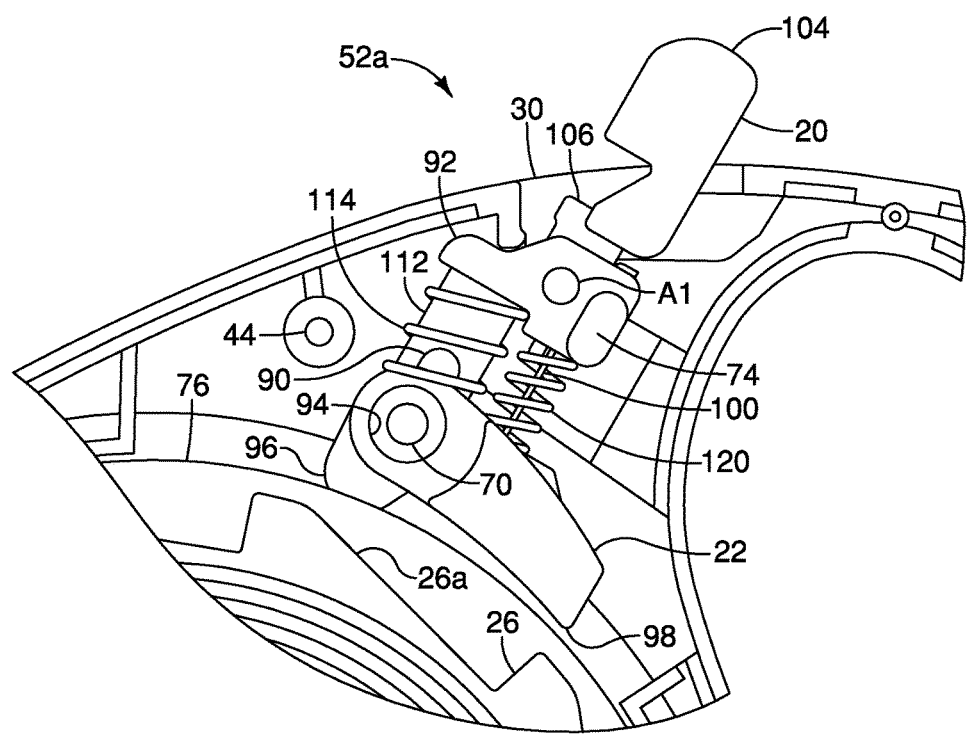
FIG. 7 is a partial elevational view of the retractable pet leash assembly illustrated in FIGS. 1 to 4 with the operating member in a pawl non-engaged position and the pawl in a first position.
Figure 8:
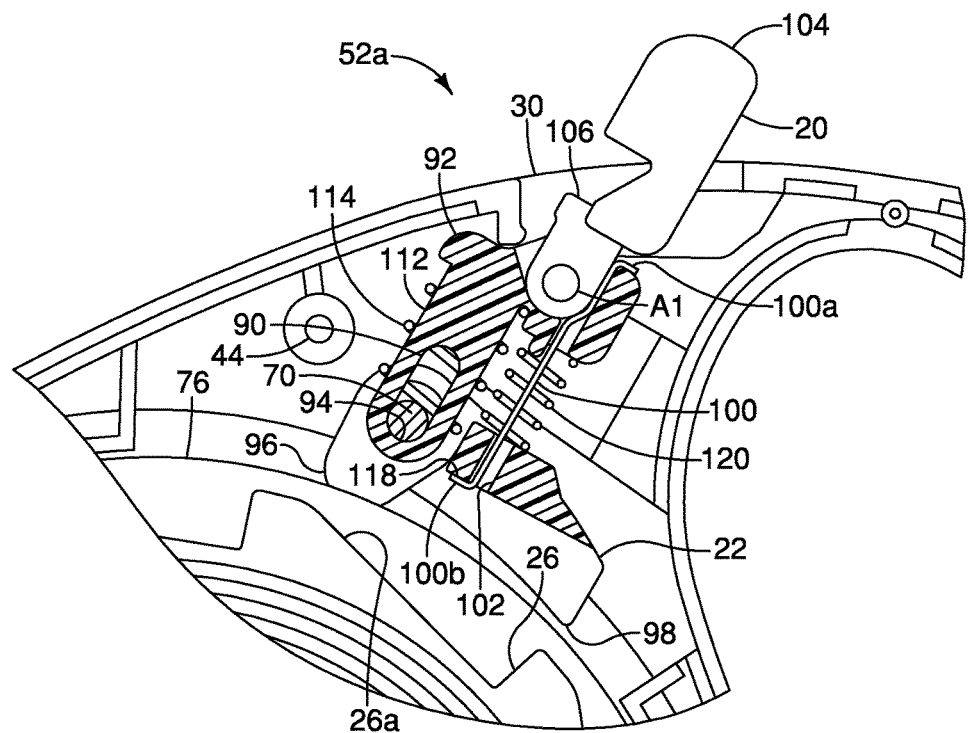
FIG. 8 is a partial elevational view of the retractable pet leash assembly illustrated in FIGS. 1 to 4 with a linkage of the braking assembly shown in cross section to show a hook of the second link.

The linkage axle 70 is a rigid member that is inserted into the first and second supporting recesses 68a and 68b of the housing 12. The linkage 24, the operating member 20 and the pawl 22 are movably supported on the housing 12 by the linkage axle 70. As best seen in FIGS. 7 and 8, the linkage axle 70 extends through a slot 90 of the linkage 24. In particular, the linkage axle 70 extends through the slot 90 of a first link 92 of the linkage 24. The linkage axle 70 also extends through an axle receiving hole 94 of the pawl 22. Thus, the linkage axle 70 pivotally supports the linkage 24 and the pawl 22 to move the pawl 22 between the first and second positions into and out of the rotational path of the braking notches 26.

Figure 11:
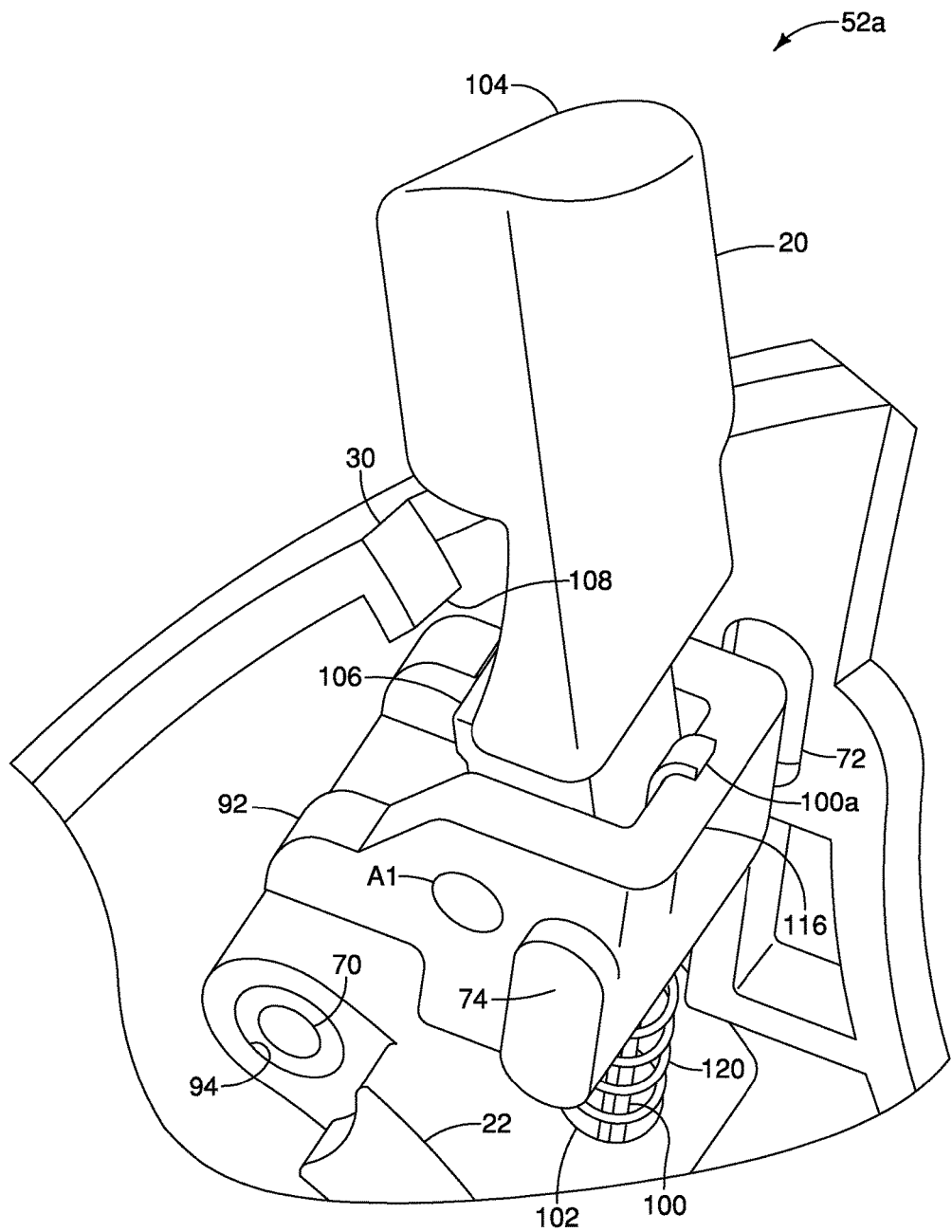
FIG. 11 is an enlarged top perspective view of the braking assembly illustrated in FIGS. 5 to 10.
Figure 12:
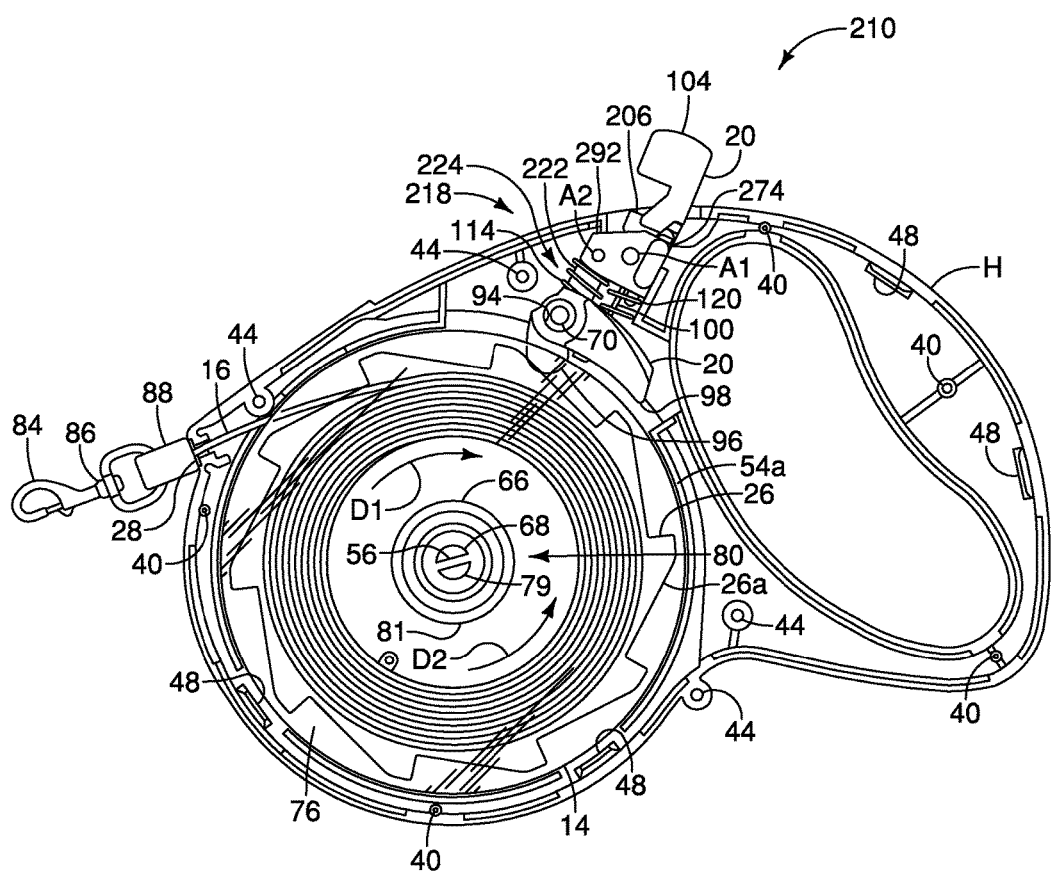
FIG. 12 is a side elevational a retractable pet leash assembly in accordance with a second illustrated embodiment with a part of the housing removed to reveal a spool and a braking assembly disposed in the housing.
Figure 13:
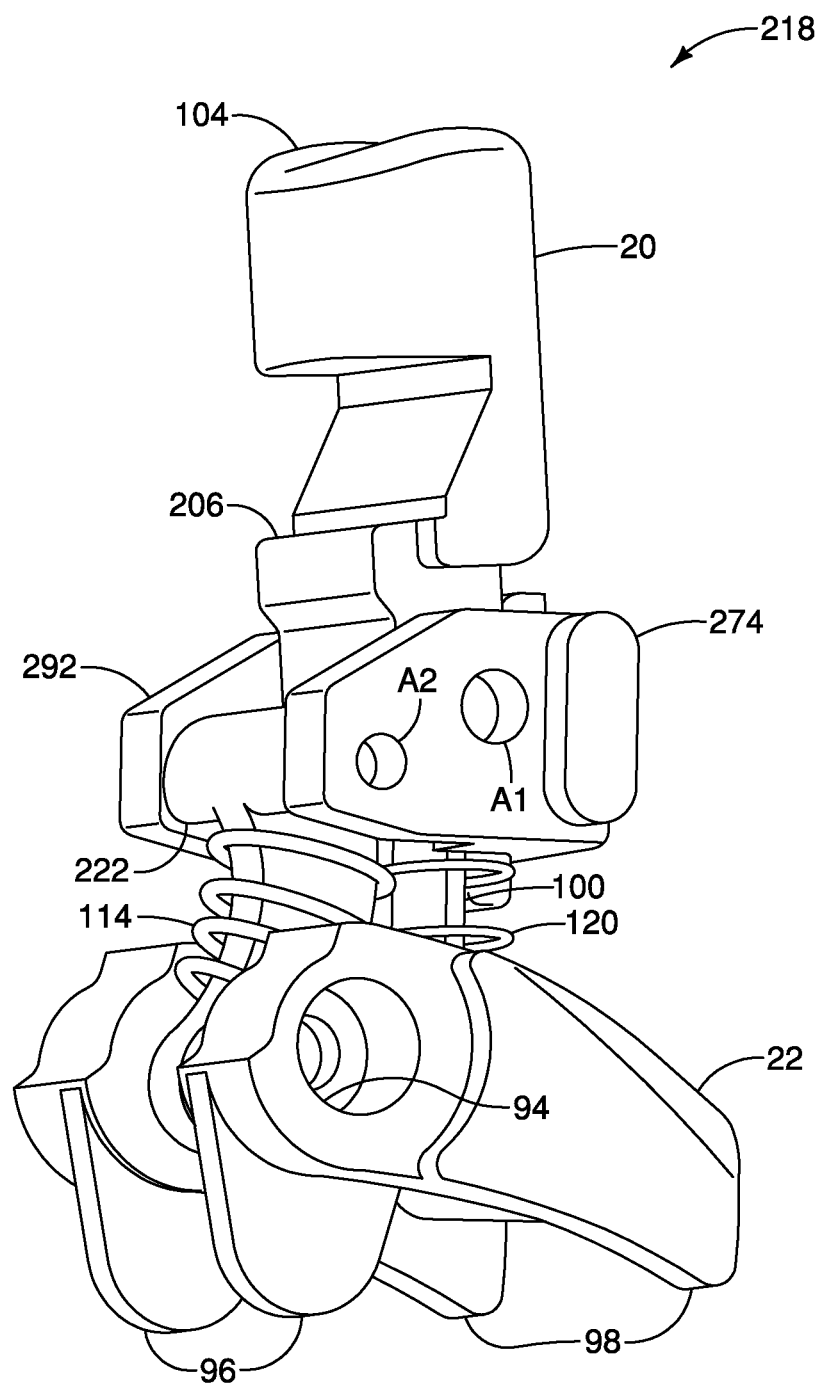
FIG. 13 is an enlarged perspective view of the braking assembly of the retractable pet leash assembly illustrated in FIG. 12.
Figure 14:
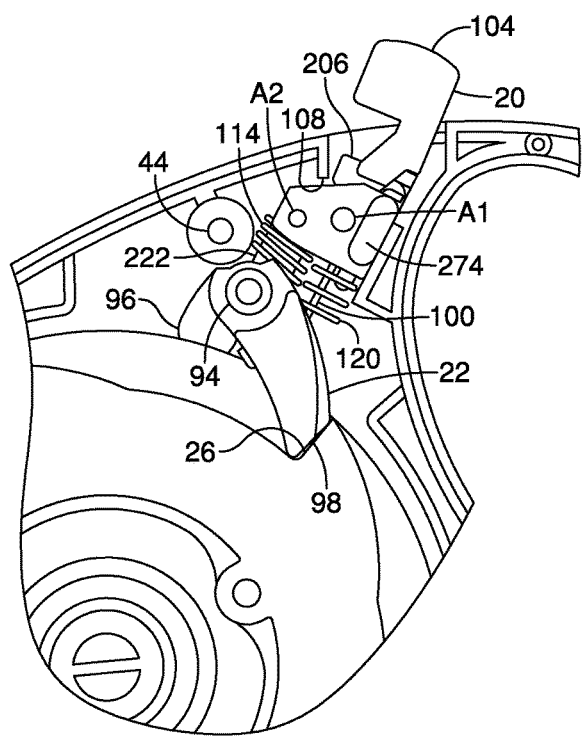
FIG. 14 is a partial elevational view of the retractable pet leash assembly illustrated in FIG. 12 with the operating member in a first pawl engaged position and the pawl in a second position.
Figure 15:
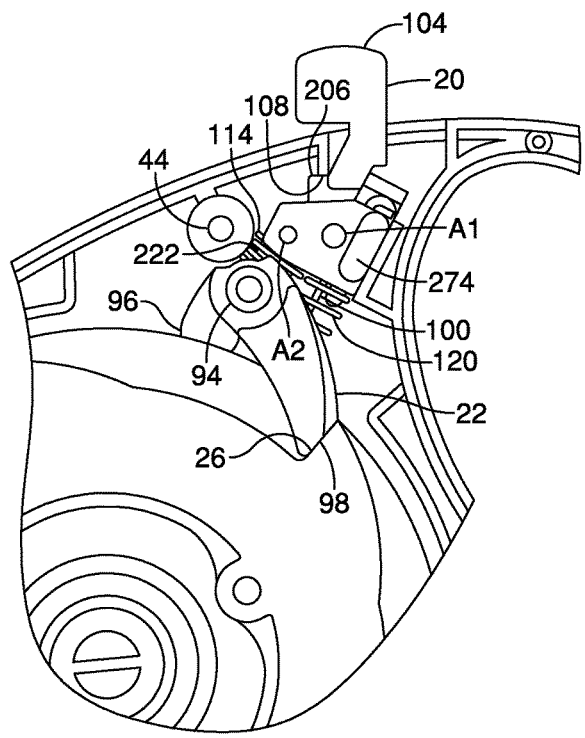
FIG. 15 is an partial elevational view of the retractable pet leash assembly illustrated in FIGS. 12 to 14 with the operating member in a second pawl engaged position and the pawl in the second position.

The pawl 22 of the braking assembly 18 will now be discussed. The pawl 22 is constructed of a rigid material such as plastic or metal. The pawl 22 is pivotally arranged about the linkage axle 70 to selectively engage the braking notches 26 of the spool 14 via operation of the operating member 20. In other words, the pawl 22 is pivotally arranged about the linkage axle 70 of the housing 12 to move into and out of engagement with the braking notches 26 of the spool 14. The pawl 22 is movable between the first position in which the spool 14 can rotate in both directions and the second position in which the spool 14 can only rotate in the first rotational direction D1 via user operation of the user operating member 20. Accordingly, the pawl 22 is disposed out of the rotational path of the braking notches 26 in the first position (FIGS. 7 and 8). The first position of the pawl 22 corresponds to a pawl non-engaged position of the operating member 20. As shown, the operating member 20 extends from the housing 12 at its fullest length when the pawl 22 is in the first position. The pawl 22 is disposed in the rotational path of the braking notches 26 in the second position (FIGS. 9 and 10). When the pawl 22 is in the second position, the operating member 20 can be in either a first pawl engaged position (FIG. 10) or in a second pawl engaged position (FIG. 11). When the pawl 22 engages the braking notches 26, the spool 14 can rotate in the first rotational direction D1 only and extension of the leash 16 from the housing 12 is prevented. The positions of the operating member 20 will be further discussed below.

As best seen in FIGS. 5 to 8, the pawl 22 has a pair of downward protruding flanges 96. Each of the flanges 96 abut an inside surface edge of one of the end plates 76 of the spool 14. Thus, the flanges 96 are disposed in the space between the two end plates 76 of the spool 14. The flanges 96 serve as securing members that align the pawl 22 with the spool 14 during rotational movement of the spool 14.

The pawl 22 has a pair of engagement surfaces 98 for engaging the braking notches 26. The engagement surfaces 98 are configured to ratchet along the slanted surfaces 26a and the braking notches 26 when the pawl 22 is in the rotational path of the braking notches 26. Each of the engagement surfaces 98 is configured to ratchet along a set of the braking notches 26 on one of the end plates 76 of the spool 14. It will be apparent to one skilled in the pet product field from this disclosure that the spool 14 can be reconfigured such that only one end plate 76 includes the braking notches 26 and that the pawl 22 includes a single engagement surface 98.

As previously stated, the pawl 22 is pivotally connected to the operating member 20 via the linkage 24. In particular, the linkage 24 includes the first link 92, mentioned above and a second link 100 in the form of a hook. As best seen in FIG. 5, the pawl 22 further includes an opening 102 that receives the hook (i.e., the second link 100) of the linkage 24. The engagement of the pawl 22 and the linkage 24 will be further explained below.

The operating member 20 will now be discussed with reference to FIGS. 7 to 11. The operating member 20 includes a user operating portion 104 that projects outside of the housing 12 to be accessible to the user. The operating member 20 is a rigid member that is preferably made of plastic or metal. The operating member 20 is movably arranged about the linkage 24 to selectively move the pawl 22 between the first position of the pawl 22 and the second position of the pawl 22 as mentioned above. As shown, the operating member 20 is pivotally coupled to the linkage 24 which is controls the movement of the pawl 22 as a result of the operation of the operating member 20.

In the illustrated embodiment as shown, the operating member 20 has the pawl non-engaged position (FIGS. 7 and 8), the first pawl engaged position (FIG. 9) and the second pawl 22 engaged position (FIG. 10). In the pawl non-engaged position, the operating member 20 extends furthest from the housing 12 as it has not been pushed into the housing 12. The pawl 22 is held in the first position out of the rotational path of the braking notches 26 by the operating member 20 when the operating member 20 is in the pawl non-engaged position. The operating member 20 is moved further into the housing 12 when the operating member 20 is pushed by the user. As a result of this movement of the operating member 20 into the housing 12, the pawl 22 moves into the rotational path of the braking notches 26, as seen in FIG. 9. Stated differently, the pawl 22 is in the second position while the operating member 20 is operated with respect to the housing 12 to be in the first pawl engaged position. On the other hand, the operating member 20 is retained with respect to the housing 12 when the operating member 20 is in the second pawl engaged position, as seen in FIG. 10. In the second pawl engaged position of the operating member 20, the pawl 22 is retained in the second position and is disposed in the rotational path of the braking notches 26 without the need for constant user contact with the operating member 20.

To operate the leash assembly 10, the user pushes on the operating member 20 farther into the housing 12 to exert pressure on the linkage 24 and push the pawl 22 into the rotational path of the braking notches 26. Thus, the operating member 20 is movable along a first operating path P1 (FIG. 9) in which the pawl 22 is moved into engagement with the braking notches 26 via pushing of the operating member 20. In this manner, the operating member 20 is pushed to move the pawl 22 between the first position and the second position. The first operating path P1 in which the operating member 20 is pushed into the housing 12 is a linear path and the protrusions 74 move along the guiding surfaces 72 of the housing 12. Thus, the operating member 20 moves linearly along first operating path P1.

The operating member 20 is configured to pivot with respect to the linkage 24 about an axis A1. The operating member 20 pivots with respect to the housing 12 in a second operating path P2 (FIG. 10). As the operating member 20 moves linearly along the first operating path P1 and pivots to move along the second operating path P2, the second operating path P2 is not parallel with the first operating path P1. The operating member 20 pivots along the second operating path P2 to retain the operating member 20 relative to the housing 12 while the pawl 22 is maintained in the second position. To retain the pawl 22 in the second position, a locking surface 106 of the operating member 20 engages with a corresponding surface 108 of the housing 12 to hold the operating member 20 in the second pawl engaged position.

The linkage 24 of the leash assembly 10 will now be discussed. As previously stated, the braking assembly 18 includes the linkage 24 interconnecting the operating member 20 and the pawl 22. The linkage 24 is a rigid member that can be constructed of plastic or metal. As previously stated, the linkage 24 comprises the first link 92 and the second link 100. The first link 92 is pivotally coupled to the operating member 20 at the first linkage axis A1.

The first link 92 is preferably constructed of a rigid material such as plastic. Referring back to FIGS. 5 to 8, the first link 92 includes the elongated slot 90 that is located at a first portion 112 of the first link 92. As shown, the first portion 112 having the slot 90 is a downward protrusion of the first link 92. The slot 90 is configured to receive the linkage axle 70 of the housing 12. When the operating member 20 is moved further into the housing 12 during operation, the linkage 24 moves linearly to receive the linkage axle 70 along the slot 90 of the first link 92.

The linkage 24 further comprises a link spring 114 that is operatively arranged to maintain the linkage 24 in a rest position in which the operating member 20 is positioned in the pawl non-engaged position. The link spring 114 is preferably a compression spring wound about the first portion 112. One end of the link spring 114 abuts the linkage axle 70 while the other end abuts the linkage 24. When the user operating member 20 is pushed into the housing 12, the link spring 114 is compressed so that the pawl 22 can now move into the rotational path of the braking notches 26.

The second link 100 of the linkage 24 will now be discussed. The second link 100 is a rigid member that is preferably constructed of plastic or metal into a double ended hook. The second link 100 has a first hook end 100a connected to the first link 92 and a second hook end 100b engaging the pawl 22. The first hook end 100a of the second link 100 contacts on an upper surface 116 of the first link 92, as shown in FIG. 5. The second hook end 100b of the second link 100 extends through the opening 102 of the pawl 22 to abut a bottom surface 118 of the pawl 22, as seen in FIGS. 6 and 8. As best seen in FIG. 8, the second link 100 is configured to hold the pawl 22 out of engagement with the braking notches 26 of the spool 14.

The linkage 24 further comprises a pawl spring 120 wound about the second link 100. The pawl spring 120 is preferably also a compression spring. Thus, in the illustrated embodiment, at least one of the link spring 114 and the pawl spring 120 is a compression spring, preferably both being compression springs. The pawl spring 120 biases the pawl 22 towards engagement with the spool 14. To prevent the pawl 22 from constantly engaging the spool 14 due to the biasing force of the pawl spring 120, the second link 100 maintains the pawl 22 in the second position out of the rotating path of the braking notches 26. Thus, the pawl spring 120 is operatively arranged about the second link 100 to bias the pawl 22 into engagement with the second hook end 100b of the second link 100. In this way, the second link 100 holds the pawl 22 in the pawl non-engaged position against the biasing force of the pawl spring 120. When the operating member 20 is moved during use, the operating member 20 pushes on the first link 92 which compresses the link spring 114 while the pawl spring 120 expands to push the pawl 22 into the rotating path of the braking notches 26. The first link 92 also pushes the second link 100 towards the spool 14 allowing the pawl spring 120 to push the pawl 22 into one of the braking notches 26 such that a space is created between the second hook end 100b and the bottom surface 118 of the pawl 22. In other words, when the operating member 20 is operated, the second link 100 is pushed downwards to no longer hold the pawl 22 in the first position out of the rotational path of the braking notches 26. This allows the pawl spring 120 to bias the pawl 22 into the second position into the rotational path of the braking notches 26.

Referring now to FIGS. 12 to 15, a retractable pet leash assembly 210 in accordance with a second illustrated embodiment will now be discussed. Due to the similarity between the leash assembly 210 and the leash assembly 10, structures of the leash assembly 210 that are identical (despite having different sizes) to corresponding structures of the leash assembly 10 will receive the same reference numeral. Any modified structures of the leash assembly 210 will receive the same reference numeral as that of the corresponding structures of the leash assembly 10 but beginning in the 200s.

The leash assembly 210 of the second illustrated embodiment is configured for smaller sized pets relative to the leash assembly 10 of the first illustrated embodiment. Thus, the leash assembly 210 includes a housing 12 having a linkage axle 70, a spool 14, a leash 16, and a modified braking assembly 218. The housing 12, the spool 14 and the leash 16 are identical to the housing 12, the spool 14 and the leash 16 of the leash assembly 10 of the first illustrated embodiment except that they are smaller in size.

The modified braking assembly 218 further includes an operating member 20, a modified linkage 224 and a pawl 22. The operating member 20 and the pawl 22 are identical to the operating member 20 and the pawl 22 of the leash assembly 10 of the first illustrated embodiment except that they are smaller in size. The modified linkage 224 includes a modified first link 292, a second link 100 and a third link 222. In the modified linkage 224, the first link 292 and the second link 100 are smaller than the first and second links 92 and 110 of the leash assembly 10 of the first illustrated embodiment. The second link 100 is otherwise identical to the second link 100. The second link 100 is a double ended hook that maintains the pawl 22 out of the rotational path of the braking notches 26 when the operating member 20 is in the pawl non-engaged position.

The modified first link 292 includes a first axle A1 pivotally coupling the operating member 20 to the modified linkage 224 and further includes a second axle A2 pivotally coupling the first link 292 and the third link 222. Thus, the third link 222 pivotally couples the first link 292 to the pawl 22. The linkage 24 axle of the housing 12 is received by an elongated slot (not shown) of the third link 222 and an axle receiving hole 94 of the pawl 22 such that the pawl 22 is pivotally arranged about the linkage axle 70. As shown, the third link 222 basically corresponds to the first portion 112 of the first link 92 of the first illustrated embodiment but modified to be a separate link. The additional link (the third link 222) of the modified linkage 224 enables the modified linkage 224 to be more compact to fit inside the smaller housing 12 of the leash assembly 210. The third link 222 can pivot about the second linkage axle A2 in response to operation of the operating member 20 to enable a more compact structure of the modified linkage 224 during use.

The modified linkage 224 further includes a link spring 114 and a pawl spring 120. In the illustrated embodiment, the link spring 114 and the pawl spring 120 are identical to the link spring 114 and pawl spring 120 of the leash assembly 10 of the first illustrated embodiment except they are smaller in size to be compatible with the modified linkage 224. The link spring 114 is arranged about the third link 222 to maintain the linkage 224 in a rest position in which the pawl 22 is held out of the rotational path of the braking notches 26. The pawl spring 120 is arranged about the second link 100 to bias the pawl 22 into engagement with the hook of the second link 100. Thus, the pawl 22 is held out of the rotational path of the braking notches by the second link 100 when the operating member 20 is not operated upon.

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups and/or steps. The foregoing also applies to words having similar meanings such as the terms, "including", "having" and their derivatives. Also, the terms "part," "section," "portion," or "member" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element: and configurations in which one element is integral with another element, i.e. one element is essentially part of the other element. This definition also applies to words of similar meaning, for example, "connected", "coupled". "mounted" and their derivatives.

While only selected embodiments have been chosen to illustrate the present invention, it will be apparent to those skilled in the pet product field from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A retractable pet leash assembly comprising:
    a housing;
    a spool rotatably disposed inside the housing, the spool being biased to rotate in a first rotational direction by a retraction spring, the spool having a plurality of braking notches;
    a leash wound about the spool and extendable from the housing; and
    a braking assembly including a pawl configured to selectively engage the braking notches of the spool, a pawl spring biasing the pawl towards engagement with the spool, and an operating member movably arranged with respect to the housing to selectively move the pawl between a first position in which the pawl is disposed out of a rotational path of the braking notches and a second position in which the pawl is disposed in the rotational path of the braking notches, the operating member having
        a pawl non-engaged position in which the pawl is held in the first position by the operating member such that said spool is capable of freely rotating,
        a first pawl engaged position in which the pawl is in the second position while the operating member is operated with respect to the housing such that said spool remains free to rotate in said first rotational direction but extension of said leash is prevented, and
        a second pawl engaged position in which the pawl is retained in the second position and the operating member is retained with respect to the housing such that said spool remains free to rotate in said first rotational direction but extension of said leash is locked.

2. The retractable pet leash assembly according to claim 1, wherein the braking assembly includes a linkage interconnecting the operating member and the pawl.

3. The retractable pet leash assembly according to claim 2, wherein
the operating member is pivotally coupled to the linkage.

4. The retractable pet leash assembly according to claim 3, wherein
the operating member is configured to pivot with respect to the linkage so that a locking surface of the operating member engages with a corresponding surface of the housing to retain the operating member in the second pawl engaged position.

5. The retractable leash according to claim 4, wherein
the braking assembly further comprises a linkage axle supported by the housing, the linkage axle extending through a slot of the first link and an axle receiving hole of the pawl.

6. The retractable leash according to claim 5, wherein
the pawl is pivotally arranged about the linkage axle to move between the first and second positions into and out of engagement with the braking notches of the spool.

7. The retractable pet leash assembly according to claim 3, wherein
the linkage further comprises a first link and a second link, the first link being pivotally coupled to the operating member, the second link having a first end connected to the first link and a second end engaging the pawl.

8. The retractable pet leash assembly according to claim 7, wherein
the linkage further includes a third link pivotally coupling the first link to the pawl.

9. The retractable pet leash assembly according to claim 8, wherein
the braking assembly includes a linkage axle received by a slot of the third link and an axle receiving hole of the pawl such that the pawl is pivotally arranged about the linkage axle.

10. The retractable pet leash assembly according to claim 9, wherein
the linkage further includes a link spring and a pawl spring, the link spring being arranged about the third link to maintain the linkage in a rest position to maintain the pawl in the first position, the pawl spring being arranged about the second link to bias the pawl into engagement with a hook of the second link, the hook maintaining the pawl in the first position.

11. The retractable pet leash assembly according to claim 7, wherein
the pawl includes an opening that receives a hook of the second end of the second link.

12. The retractable pet leash assembly according to claim 11, wherein
the linkage further comprises a link spring operatively arranged to maintain the linkage in a rest position in which the operating member is positioned in the pawl non-engaged position.

13. The retractable leash according to claim 12, wherein
the pawl spring is operatively arranged about the second link to bias the pawl into engagement with the hook of the second link so that the second link holds the pawl in the first position against the biasing force of the pawl spring.

14. The retractable leash according to claim 13, wherein
at least one of the link spring and the pawl spring is a compression spring.

15. The retractable pet leash assembly according to claim 1, wherein
the housing includes at least one guiding surface engaging a protrusion of the linkage so that the linkage moves along a linear operating path during operation of the operating member to move the pawl between the first and second positions.

16. The retractable leash assembly according to claim 15, wherein
the at least one guiding surface of the housing is oblong shaped.

17. A retractable pet leash assembly comprising:
a housing;
a spool rotatably disposed inside the housing, the spool being biased to rotate in a first rotational direction by a retraction spring, the spool having a plurality of braking notches;
a leash wound about the spool and extendable from the housing; and
a braking assembly including a pawl configured to selectively engage the braking notches of the spool, and an operating member being movable along a first operating path to move the pawl between a first position in which the pawl is disposed out of a rotational path of the braking notches and a second position in which the pawl is disposed in the rotational path of the braking notches,
the operating member being movable along a second operating path to retain the operating member relative to the housing while the pawl is maintained in the second position, such that said spool remains free to rotate in said first rotational direction but extension of said leash is locked, the second operating direction being not parallel with the first operating direction.

18. The retractable pet leash assembly in accordance with claim 17, wherein
the operating member moves linearly along first operating path and pivots with respect to the housing in the second operating path.

19. The retractable pet leash assembly in accordance with claim 18, wherein
the braking assembly includes a linkage interconnecting to the operating member to the pawl, the operating member being pivotally connected to the linkage.

20. The retractable pet leash assembly in accordance with claim 19, wherein
the linkage includes a link spring and a pawl spring, the link spring being operatively arranged to position the operating member in a position so that the pawl is in the first position,
the pawl spring being operatively arranged about the linkage to bias the pawl into engagement with a hook of the linkage to maintain the pawl in the first position.

* * * * *